United States Patent
Callier

(10) Patent No.: US 9,136,749 B1
(45) Date of Patent: Sep. 15, 2015

(54) ELEVATOR ELECTRICAL POWER SYSTEM

(71) Applicant: John M. Callier, Somerset, NJ (US)

(72) Inventor: John M. Callier, Somerset, NJ (US)

(*) Notice: Subject to any disclaimer, the term of this patent is extended or adjusted under 35 U.S.C. 154(b) by 58 days.

(21) Appl. No.: 14/035,992

(22) Filed: Sep. 25, 2013

Related U.S. Application Data

(60) Provisional application No. 61/706,834, filed on Sep. 28, 2012.

(51) Int. Cl.
 F02B 63/04 (2006.01)
 F03G 7/08 (2006.01)
 H02K 7/18 (2006.01)
 H02K 35/02 (2006.01)
 B66B 11/04 (2006.01)
 H02K 41/02 (2006.01)

(52) U.S. Cl.
 CPC ...................... *H02K 35/02* (2013.01)

(58) Field of Classification Search
 USPC ................ 290/1 R; 187/289, 251; 310/12.11; 318/135
 See application file for complete search history.

(56) References Cited

U.S. PATENT DOCUMENTS

| | | | | |
|---|---|---|---|---|
| 3,162,796 A | * | 12/1964 | Schreiber et al. | 318/135 |
| 3,554,325 A | * | 1/1971 | Savage | 187/389 |
| 3,561,571 A | * | 2/1971 | Gingrich | 187/387 |
| 3,566,224 A | * | 2/1971 | Vallauri et al. | 318/135 |
| 3,802,349 A | * | 4/1974 | Guimbal | 104/292 |
| 4,083,430 A | * | 4/1978 | Gingrich | 187/394 |
| 4,220,899 A | * | 9/1980 | von der Heide | 318/135 |
| 4,402,386 A | * | 9/1983 | Ficheux et al. | 187/289 |
| 4,570,753 A | * | 2/1986 | Ohta et al. | 187/251 |
| RE32,404 E | * | 4/1987 | Ferris | 187/277 |
| 4,719,994 A | * | 1/1988 | Kajiyama | 187/291 |
| 5,005,672 A | * | 4/1991 | Nakai et al. | 187/250 |
| 5,014,826 A | * | 5/1991 | Nakai et al. | 187/289 |
| 5,033,588 A | * | 7/1991 | Nakai et al. | 187/289 |
| 5,036,955 A | * | 8/1991 | Nakai et al. | 187/278 |
| 5,062,501 A | * | 11/1991 | Pavoz et al. | 187/289 |
| 5,074,384 A | * | 12/1991 | Nakai et al. | 187/404 |
| 5,086,881 A | * | 2/1992 | Gagnon et al. | 187/251 |
| 5,090,516 A | * | 2/1992 | Gsrinaski et al. | 187/251 |
| 5,105,109 A | * | 4/1992 | Nakai et al. | 310/12.11 |
| 5,141,082 A | * | 8/1992 | Ishii et al. | 187/289 |
| 5,183,980 A | * | 2/1993 | Okuma et al. | 187/289 |
| 5,196,770 A | * | 3/1993 | Champs et al. | 318/135 |
| 5,203,430 A | * | 4/1993 | Grinaski et al. | 187/276 |
| 5,226,507 A | * | 7/1993 | Kawarasaki | 187/251 |
| 5,235,145 A | * | 8/1993 | Olsen et al. | 187/250 |
| 5,235,226 A | * | 8/1993 | Olsen et al. | 310/12.11 |
| 5,299,662 A | * | 4/1994 | Reddy et al. | 187/251 |
| 5,300,737 A | * | 4/1994 | Nakanishi | 187/289 |
| 5,410,199 A | * | 4/1995 | Kinugasa et al. | 310/12.11 |
| 5,566,784 A | * | 10/1996 | Rennetaud | 187/249 |

(Continued)

*Primary Examiner* — Pedro J Cuevas

(74) *Attorney, Agent, or Firm* — Ruth Eure; Emery L. Tracy

(57) ABSTRACT

An electrical power system for generating electrical power in a building is provided. The building has an elevator with the elevator having at least one elevator car and the at least one elevator car within an elevator shaft. The electrical power system comprises at least one magnet counterweight connected to the at least one elevator car and at least one coil mounted within the elevator shaft. The at least one magnet counterweight moves in a downward direction as the at least one elevator car moves in an upward direction and the at least one magnet counterweight moves in an upward direction as the at least one elevator car moves in a downward direction. The magnet counterweight passes through the at least one coil thereby generating electrical current.

20 Claims, 2 Drawing Sheets

(56) References Cited

U.S. PATENT DOCUMENTS

| | | | |
|---|---|---|---|
| 5,625,174 A * | 4/1997 | Ito et al. | 187/289 |
| 5,751,076 A * | 5/1998 | Zhou | 310/12.11 |
| 6,189,657 B1 * | 2/2001 | Jessenberger | 187/289 |
| 6,305,501 B1 * | 10/2001 | Kahkipuro et al. | 187/289 |
| 6,446,769 B1 * | 9/2002 | Kangiser et al. | 188/171 |
| 6,516,922 B2 * | 2/2003 | Shadkin et al. | 187/290 |
| 7,261,186 B2 * | 8/2007 | Deplazes et al. | 187/277 |
| 7,478,706 B2 * | 1/2009 | Kocher et al. | 187/293 |
| 7,628,251 B2 * | 12/2009 | Kocher | 187/289 |
| 8,196,867 B1 * | 6/2012 | Wessels | 244/158.2 |
| 2003/0000778 A1 * | 1/2003 | Smith et al. | 187/902 |
| 2005/0077113 A1 * | 4/2005 | Deplazes et al. | 187/293 |
| 2006/0289247 A1 * | 12/2006 | Powell | 187/414 |
| 2007/0090834 A1 * | 4/2007 | Osada et al. | 324/240 |
| 2007/0199770 A1 * | 8/2007 | Kocher | 187/277 |
| 2013/0213745 A1 * | 8/2013 | Kattainen et al. | 187/288 |
| 2013/0248296 A1 * | 9/2013 | Husmann | 187/251 |
| 2015/0008768 A1 * | 1/2015 | Achterberg et al. | 310/12.11 |
| 2015/0061414 A1 * | 3/2015 | Urata | 310/12.11 |

\* cited by examiner

ELEVATOR ELECTRICAL POWER SYSTEM

The present application claims the benefit of priority of provisional patent application Ser. No. 61/706,834, filed on Sep. 28, 2012, entitled "Coil System".

BACKGROUND OF THE INVENTION

1. Field of the Invention

This invention relates generally to an elevator electrical power system and, more particularly, the invention relates to an elevator electrical power system for co-generating electrical power in buildings by converting the existing mechanisms of freight and passenger elevators into electrical generators.

2. Description of the Prior Art

The current scenario of energy production across the globe has its intrinsic problems of air pollution from all the fossils we burn, or the eco disturbance caused by the construction of dams across rivers which uproot large number of people and submerge large amounts of land which is many a times fertile and cultivable, having so much water all the time also creates problems. Nuclear energy again has its problems of waste disposal; Oil on other hand is limited in nature. Alternative sources also have its complexities like dependence on sun, wind, water tides. We have to produce energy by these means wherever they are available and then transmitted which also adds to the cost. We have a great imbalance as far as electricity production and distribution is concerned. If we could produce electricity at our discretion with a system which could be constructed close to the actual use of electricity without dependency on nature or adding to air pollution or any eco hazard, we could say we have achieved a milestone in devising a new method to produce electricity.

The proposed system is similar to the system used in dams to produce electricity, but in our case we do not have to build reservoirs for water as we do not depend on water. Hence we are independent of nature, we are harnessing the continuous flow of man made vehicles across the world. These vehicles play the role of falling water in dams which is dropped from a height to interact with the system to rotate generators which produce electricity.

SUMMARY

The present invention is an electrical power system for generating electrical power in a building. The building has an elevator with the elevator having at least one elevator car and the at least one elevator car within an elevator shaft. The electrical power system comprises at least one magnet counterweight connected to the at least one elevator car and at least one coil mounted within the elevator shaft. The at least one magnet counterweight moves in a downward direction as the at least one elevator car moves in an upward direction and the at least one magnet counterweight moves in an upward direction as the at least one elevator car moves in a downward direction. The magnet counterweight passes through the at least one coil thereby generating electrical current.

In addition, the present invention includes an electrical power system for generating electrical power by passing a moving object by a stationary object. The electrical power system comprises a plurality of magnet counterweights connected in series to the moving object and a plurality of coils mounted to the stationary object. The magnet counterweights are mounted to the moving object passes through the coils mounted to the stationary object thereby generating electrical current.

DETAILED DESCRIPTION OF THE PREFERRED EMBODIMENTS

Figure 1:
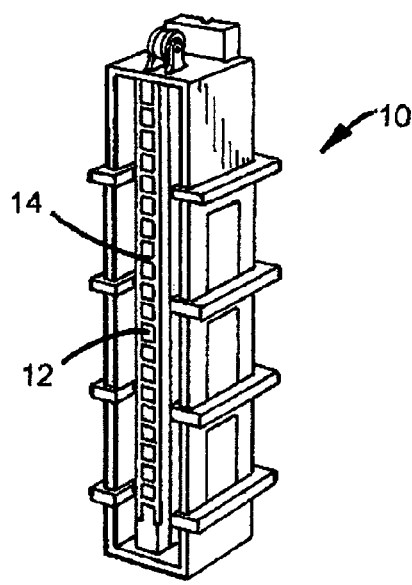
FIG. 1 is a perspective view illustrating an elevator electrical power system, constructed in accordance with the present invention.
Figure 2:
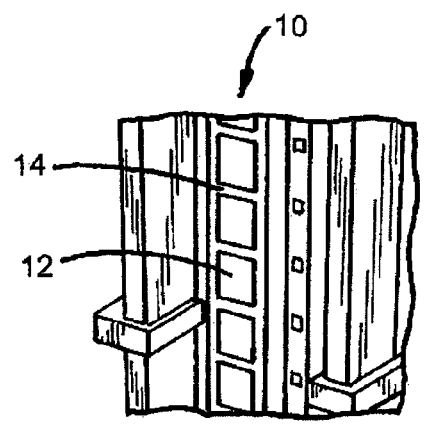
FIG. 2 is a perspective view illustrating a portion of the elevator electrical power system, constructed in accordance with the present invention.
Figure 3:
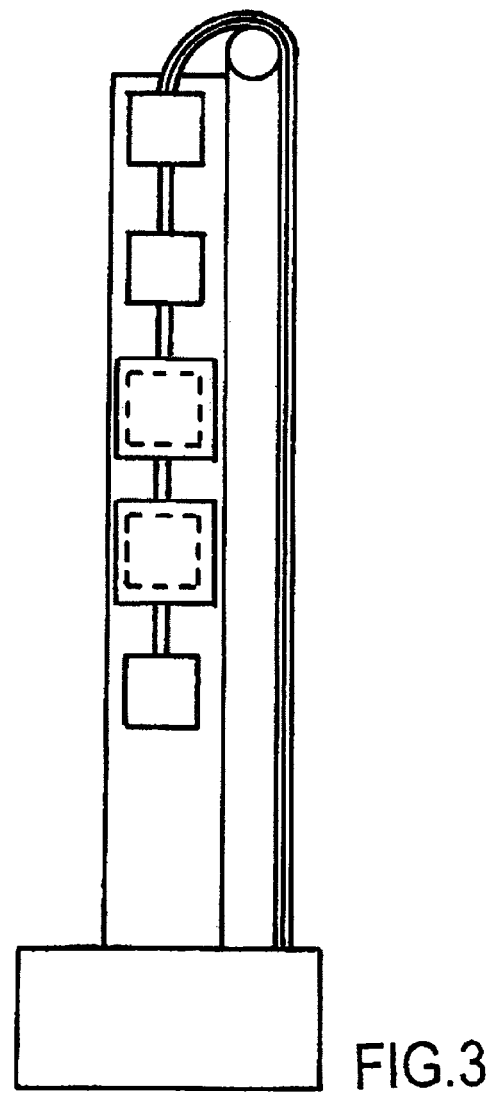
FIG. 3 is another perspective view illustrating the elevator electrical power system, constructed in accordance with the present invention.
Figure 4:
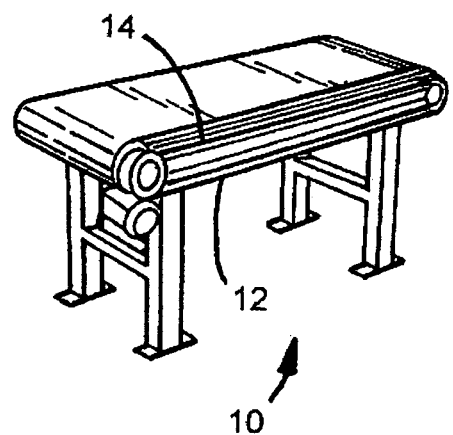
FIG. 4 is a perspective view illustrating a conveyor belt application of the elevator electrical power system, constructed in accordance with the present invention.
Figure 5:
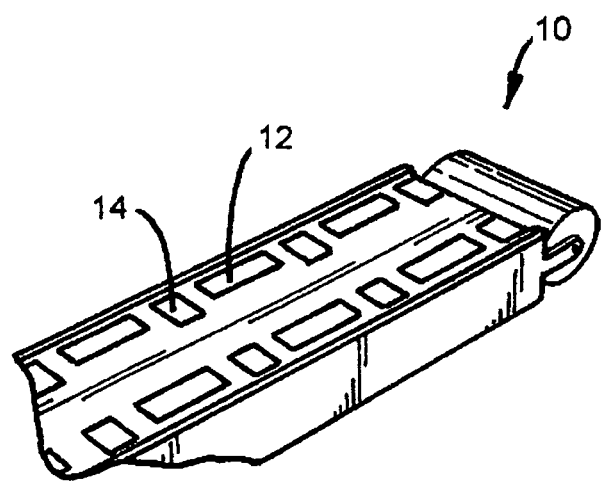
FIG. 5 is a cut-away perspective view illustrating the conveyor belt application of the elevator electrical power system, constructed in accordance with the present invention.

As illustrated in FIGS. 1-5, the present invention is an elevator electrical power system, indicated generally at 10, for co-generating electrical power in buildings by converting the existing mechanisms of freight and passenger elevators into electrical generators. The elevator electrical power system 10 of the present invention takes advantage of a basic fact of elevators, i.e., that the cars go up and down by a cable-and-pulley system, a counterweight going down as its car goes up, and going up as its car goes down, to function as follows:

The elevator counterweights of the elevator electrical power system 10 of the present invention are a plurality of powerful permanent magnets 12 or electromagnets; and these magnets 12, borne by cables which run over pulleys to counterbalance the elevator cars, will move up and down through a coil 14. In a preferred embodiment, the coil 14 consists of wound copper wire positioned in a stationary manner, perhaps a guide rail of a tube surrounding the elevator/counterweight magnets cable and secured to the frame of the building. As the elevator moves up, the magnet counterweights move down, passing through the coils (producing an electrical current) when the elevator moves down, the magnet counterweights move up passing through the coils producing an electrical current. Basically, as the magnetic counterweight passes through the metallic coil 14, electrical current will be generated.

The current will be a pulse of Alternating Current (AC), and may be used to augment a building's existing AC power supply. Also, if converted to Direct Current (through the use of a power rectifier), the electricity generated by the elevator electrical power system 10 can be used to charge storage batteries, be stored in condensers, or used directly to applications. The amount of electricity recovered from the elevator electrical power system 10 will be determined by the size of the coils and magnets, the number of coils and magnets, the speed of the elevator, and the space available.

The harnessed energy from the elevator electrical power system 10 of the present invention can be used to power the building, or can be redistributed to power specified areas, or the remainder of the building. The size and weight of the magnet 12 will be determined by the elevator size and capacity. The shape of the coil and counter weight (magnet 12) will be determined by the space available. The number and size of the coils will be determined by the demand for electricity. A permanent magnet 12, for fast moving elevators, or a variable powered, electro magnet can be used on both slow and fast moving elevators. By using flexible magnets 12, the elevator electrical power system 10 works anywhere conveyor belts are used, such as in manufacturing plants, airports, and more. The flexible magnets can be either attached to the conveyor belt or attached to a separate system driven by the same system that drives the conveyor belt. These magnets will either pass over or through the coils that are mounted on or in the conveyor belt frame thereby producing an electric current. The amount of electric power produced will be determined by the number of magnets and coils in the systems. The amount of power will also be determined by the size and speed of the magnets passing through or over the coils. As a consideration, a hydraulic version of the elevator can be constructed.

The elevator electrical power system 10 of the present invention harnesses, with a magnet 12 and coil system 14, the energy created by a moving elevator and redirects the energy as a potential alternative, or con-generation system that powers either the entire building, or specified areas of the building. The elevator electrical power system 10 can providing "green" energy to the building or dwelling in which it is used. The elevator electrical power system 10 not only helps save the environment, but also saves the user or building owner money in power costs.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein may be suitably practiced in the absence of the specific elements which are disclosed herein.

What is claimed is:

1. An electrical power system for generating electrical power in a building, the building having an elevator, the elevator having at least one elevator car, the at least one elevator car within an elevator shaft, the electrical power system comprising:
    at least one magnet counterweight connected to the at least one elevator car; and
    at least one coil mounted within the elevator shaft;
    wherein the at least one magnet is a flexible magnet mounted to a conveyor belt and the at least one coil is mounted to a conveyor frame;
    wherein the at least one magnet counterweight moves in a downward direction as the at least one elevator car moves in an upward direction;
    wherein the at least one magnet counterweight moves in an upward direction as the at least one elevator car moves in a downward direction; and
    wherein the magnet counterweight passes through the at least one coil thereby generating electrical current.

2. The electrical power system of claim 1 wherein the at least one magnet counterweight is a permanent magnet movable through the coil.

3. The electrical power system of claim 1 wherein the at least one coil is in the form of a tube fixedly mounted in the elevator shaft.

4. The electrical power system of claim 1 and further comprising:
    a plurality of spaced coils mounted within the elevator shaft;
    wherein the at least one magnet counterweight sequentially passes through the spaced coils as the at least one magnet counterweight travels up and down within the elevator shaft thereby generating electrical current.

5. The electrical power system of claim 4 and further comprising:
    a plurality of magnet counterweights; and
    each of the magnet counterweights connected together with a cable.

6. The electrical power system of claim 1 wherein the coil includes wound copper wire.

7. The electrical power system of claim 1 wherein the electrical current is a pulse of Alternating Current (AC).

8. The electrical power system of claim 7 and further comprising:
    a power rectifier for converting electrical current into direct current.

9. The electrical power system of claim 8 wherein the generated direct current is uses to charge storage batteries, be stored in condensers, or used directly to applications.

10. The electrical power system of claim 1 wherein the magnet is a variable powered, electro magnet.

11. The electrical power system of claim 1 wherein the magnet is a variable powered, electro magnet.

12. The electrical power system of claim 1 wherein the magnets are flexible magnets mounted to a conveyor belt and the coils are mounted to a conveyor frame.

13. An electrical power system for generating electrical power by passing a moving object by a stationary object, the electrical power system comprising:
    a plurality of magnet counterweights connected in series to the moving object; and
    a plurality of coils mounted to the stationary object;
    wherein the magnet counterweights are mounted to the moving object passes through the coils mounted to the stationary object thereby generating electrical current; and
    wherein the moving object is a conveyor belt and the stationary object is conveyor belt frame.

14. The electrical power system of claim 13 wherein the magnet counterweights are permanent magnets mounted on the moving object and movable through the coil.

15. The electrical power system of claim 13 wherein the coils are in the form of a tube surrounding the magnet counterweights.

16. The electrical power system of claim 13 and further comprising:
    a plurality of spaced coils mounted on the stationary object and surrounding the moving object;
    wherein the magnets sequentially passes through the spaced coils as the magnets travel on the moving object thereby generating electrical current.

17. The electrical power system of claim 13 wherein the coil includes wound copper wire.

18. The electrical power system of claim 13 and further comprising:
    a power rectifier for converting electrical current into direct current;
    wherein the generated direct current is uses to charge storage batteries, be stored in condensers, or used directly to applications.

19. An electrical power system for generating electrical power by passing a moving object by a stationary object, the electrical power system comprising:
    a plurality of magnet counterweights connected in series to the moving object; and
    a plurality of coils mounted to the stationary object;

wherein the magnet counterweights are mounted to the moving object passes through the coils mounted to the stationary object thereby generating electrical current; and wherein the magnets are flexible magnets mounted to a conveyor belt and the coils are mounted to a conveyor frame.

20. The electrical power system of claim 19 wherein the moving object is a conveyor belt and the stationary object is conveyor belt frame.

* * * * *